(12) United States Patent
Yun

(10) Patent No.: US 9,806,632 B2
(45) Date of Patent: Oct. 31, 2017

(54) PHOTOVOLTAIC INVERTER

(71) Applicant: LSIS CO., LTD., Anyang-si, Gyeonggi-do (KR)

(72) Inventor: Dong Jin Yun, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 579 days.

(21) Appl. No.: 14/476,513

(22) Filed: Sep. 3, 2014

(65) Prior Publication Data

US 2015/0069859 A1 Mar. 12, 2015

(30) Foreign Application Priority Data

Sep. 11, 2013 (KR) ..................... 10-2013-0109299

(51) Int. Cl.
| | |
|---|---|
| *H02M 7/44* | (2006.01) |
| *H02H 11/00* | (2006.01) |
| *H02J 3/38* | (2006.01) |
| *H02H 7/122* | (2006.01) |

(52) U.S. Cl.
CPC ............ *H02M 7/44* (2013.01); *H02H 7/1222* (2013.01); *H02H 11/002* (2013.01); *H02J 3/383* (2013.01); *Y02E 10/563* (2013.01)

(58) Field of Classification Search
CPC ..... H02H 11/002; H02H 7/1222; H02J 3/383; H02M 7/44; Y02E 10/563
USPC ......................................................... 307/151
See application file for complete search history.

(56) References Cited

U.S. PATENT DOCUMENTS

| | | | | |
|---|---|---|---|---|
| 4,513,207 A | * | 4/1985 | Bloomer ................... | G05B 1/02 307/126 |
| 6,157,170 A | * | 12/2000 | Noda ................... | G01R 31/3648 320/130 |
| 6,316,770 B1 | * | 11/2001 | Ouvrier-Buffet ......... | G01J 5/20 250/336.1 |

(Continued)

FOREIGN PATENT DOCUMENTS

| | | |
|---|---|---|
| CN | 101682255 | 3/2010 |
| CN | 201830164 | 5/2011 |

(Continued)

OTHER PUBLICATIONS

Japan Patent Office Application Serial No. 2014-183873, Office Action dated Nov. 24, 2015, 5 pages.

(Continued)

*Primary Examiner* — Thienvu Tran
*Assistant Examiner* — Brian K Baxter
(74) *Attorney, Agent, or Firm* — Lee, Hong, Degerman, Kang & Waimey PC

(57) ABSTRACT

A photovoltaic inverter includes: an input unit to connected to a first terminal and a second terminal to which a positive (+) polarity or a negative (−) polarity of a photovoltaic module are connected; a switching device configured to control the first terminal and the second terminal connected to the input unit according to pre-set polarities of an inverter unit; a booster unit configured to boost a voltage of the photovoltaic module delivered form the input unit through the switching device; a capacitor configured to charge the voltage boosted by the booster unit; and an inverter unit configured to convert the voltage charged in the capacitor into an alternating current (AC) and provide the converted AC voltage for an electric power system.

5 Claims, 3 Drawing Sheets

(56) References Cited

U.S. PATENT DOCUMENTS

| | | | | |
|---|---|---|---|---|
| RE42,039 E | * | 1/2011 | West | H02M 7/5387 323/222 |
| 2003/0112646 A1 | * | 6/2003 | Scott | H02M 1/08 363/134 |
| 2008/0285317 A1 | * | 11/2008 | Rotzoll | H02M 7/003 363/80 |
| 2009/0141522 A1 | * | 6/2009 | Adest | H02J 1/102 363/55 |
| 2009/0302686 A1 | * | 12/2009 | Fishman | H02M 7/49 307/82 |
| 2010/0202172 A1 | * | 8/2010 | Skirda | G05D 23/20 363/89 |
| 2011/0273017 A1 | * | 11/2011 | Borup | H02J 3/383 307/63 |
| 2012/0161527 A1 | * | 6/2012 | Casey | H01L 31/02021 307/80 |
| 2012/0280567 A1 | | 11/2012 | Buller et al. | |
| 2012/0300347 A1 | | 11/2012 | Fahrenbruch et al. | |
| 2013/0113293 A1 | * | 5/2013 | Elpel | H02M 3/1584 307/82 |
| 2013/0314072 A1 | * | 11/2013 | Miyazaki | G01R 25/00 324/76.77 |
| 2014/0021893 A1 | * | 1/2014 | Komatsu | H02H 3/08 318/400.22 |
| 2014/0192905 A1 | * | 7/2014 | Kim | H04B 3/02 375/257 |

FOREIGN PATENT DOCUMENTS

| | | |
|---|---|---|
| DE | 10001485 | 7/2001 |
| EP | 2259420 | 12/2010 |
| EP | 2315341 | 4/2011 |
| JP | 06-284570 | 10/1994 |
| JP | 2001-165966 | 6/2001 |
| JP | 2003-284351 | 10/2003 |
| JP | 2008-312355 | 12/2008 |
| JP | 2013-102042 | 5/2013 |
| KR | 10-2007-0078524 | 8/2007 |
| KR | 10-2013-0090253 | 8/2013 |

OTHER PUBLICATIONS

European Patent Office Application Serial No. 14183224.6, Search Report dated Feb. 4, 2015, 6 pages.
State Intellectual Property Office of the People's Republic of China Application Serial No. 201410462289.9, Office Action dated Aug. 2, 2016, 8 pages.
Japan Patent Office Application Serial No. 2014-183873, Notice of Allowance dated Jul. 26, 2016, 4 pages.
Korean Intellectual Property Office Application Serial No. 10-2013-0109299, Office Action dated Aug. 29, 2016, 4 pages.

* cited by examiner

PHOTOVOLTAIC INVERTER

CROSS-REFERENCE TO RELATED APPLICATION

Pursuant to 35 U.S.C. §119(a), this application claims the benefit of earlier filing date and right of priority to Korean Application No. 10-2013-0109299, filed on Sep. 11, 2013, the contents of which are all hereby incorporated by reference herein in its entirety.

BACKGROUND OF THE INVENTION

1. Field of the Invention

The present disclosure relates to a photovoltaic inverter including a switching device to be connected to a photovoltaic module, and more particularly, to a photovoltaic inverter properly connected to a photovoltaic module through a switching device regardless of connection polarities.

2. Background of the Invention

In general, a photovoltaic inverter (or a grid-connected inverter) is a power conversion device that connects an input electric power system and a commercial electric power system and transmits electric power from the input electric power system to the commercial electric power system.

An input terminal of a photovoltaic inverter is connected to an input terminal of a photovoltaic module (or a solar cell module) and an input terminal, and here, since the photovoltaic module has two polarities, i.e., positive (+) and negative (−) polarities, the input terminal of the photovoltaic inverter also has two positive (+) and negative (−) polarities.

An alternating current (AC) is nonpolar, eliminating the attention to be paid for polarities in case of connection, but a direct current (DC) has positive (+) and negative (−) polarities, so a positive (+) polarity should be connected to a positive (+) polarity and a negative (−) polarity should be connected to a negative (−) polarity.

In this context, regarding the photovoltaic inverter, if an operator does not connect properly positive (+) polarities and negative (−) polarities between a photovoltaic module and the photovoltaic inverter in installing the photovoltaic inverter in the photovoltaic module, namely, if the photovoltaic inverter and the photovoltaic module are connected at mutually different polarities, when the photovoltaic inverter is operated, a large current flows instantaneously, causing a spark to damage the photovoltaic inverter.

SUMMARY OF THE INVENTION

Therefore, an aspect of the detailed description is to provide a photovoltaic inverter including a switching device and properly connected to a photovoltaic module through the switching device regardless of connection polarities.

To achieve these and other advantages and in accordance with the purpose of this specification, as embodied and broadly described herein, a photovoltaic inverter may include: an input unit to connected to a first terminal and a second terminal to which a positive (+) polarity or a negative (−) polarity of a photovoltaic module are connected; a switching device configured to control the first terminal and the second terminal connected to the input unit according to pre-set polarities of an inverter unit; a booster unit configured to boost a voltage of the photovoltaic module delivered form the input unit through the switching device; a capacitor configured to charge the voltage boosted by the booster unit; and an inverter unit configured to convert the voltage charged in the capacitor into an alternating current (AC) and provide the converted AC voltage for an electric power system.

The inverter unit may include a positive (+) polarity connection terminal; and a negative (−) polarity connection terminal.

When the positive (+) polarity of the photovoltaic module is connected to the first terminal and the negative (−) polarity of the photovoltaic module is connected to the second terminal, the switching device may connect the first terminal to the positive (+) polarity connection terminal of the inverter unit and the second terminal to the negative (−) polarity connection terminal of the inverter unit.

When the negative (−) polarity of the photovoltaic module is connected to the first terminal and the positive (+) polarity of the photovoltaic module is connected to the second terminal, the switching device may connect the first terminal to the negative (−) polarity connection terminal of the inverter unit and the second terminal to the positive (+) polarity connection terminal of the inverter unit.

The photovoltaic inverter may include a switching device that automatically connects the positive (+) polarity or negative (−) polarity of the photovoltaic module to the first terminal and the second terminal according to polarities of the inverter unit, wherein the switching device includes: a first input terminal connected to the first terminal at one end thereof; a second input terminal connected to the second terminal at one end thereof; a first comparator configured to compare the first input terminal with a pre-set reference voltage and output a first comparison result including a high signal or a low signal; a second comparator configured to compare the second input terminal with the reference voltage and output a second comparison result, opposite to the first comparison result, including a low signal or a high signal; a first switching unit connected to the first input terminal at one end thereof and switched based on an output from the first comparator; a second switching unit connected to the second input terminal at one end thereof and switched based on an output from the second comparator; a first output terminal configured to connect the first input terminal to the positive (+) polarity connection terminal of the inverter unit when the output from the first comparator is a high signal, or configured to connect the second input terminal to the positive (+) polarity connection terminal of the inverter unit when the output from the second comparator is a high signal; and a second output terminal configured to connect the first input terminal to the negative (−) polarity connection terminal of the inverter unit when the output from the first comparator is a low signal, or configured to connect the second input terminal to the negative (−) polarity connection terminal of the inverter unit when the output from the second comparator is a low signal.

When the positive (+) polarity of the photovoltaic module is connected to the first input terminal through the first terminal and the negative (−) polarity of the photovoltaic module is connected to the second input terminal through the second terminal, the first comparator may output a high signal, the second comparator may output a low signal, the first switching unit may output a voltage having the positive (+) polarity of the first input terminal to the first output terminal based on the high signal from the first comparator, and the second switching unit may output a voltage having the negative (−) polarity of the second input terminal to the second output terminal based on the low signal from the second comparator.

When the negative (−) polarity of the photovoltaic module is connected to the first input terminal through the first terminal and the positive (+) polarity of the photovoltaic module is connected to the second input terminal through the second terminal, the first comparator may output a low signal, the second comparator may output a high signal, the first switching unit may output a voltage having the negative (−) polarity of the first input terminal to the second output terminal based on the low signal from the first comparator, and the second switching unit may output a voltage having the positive (+) polarity of the second input terminal to the first output terminal based on the high signal from the second comparator.

According to embodiments of the present disclosure, the photovoltaic inverter includes a switching device, so that the photovoltaic inverter can be normally connected to the photovoltaic module regardless of a connection polarity, and even when an operator erroneously connect polarities between a photovoltaic module and the photovoltaic inverter, damage to the photovoltaic inverter can be prevented and the photovoltaic inverter can normally perform a function thereof.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
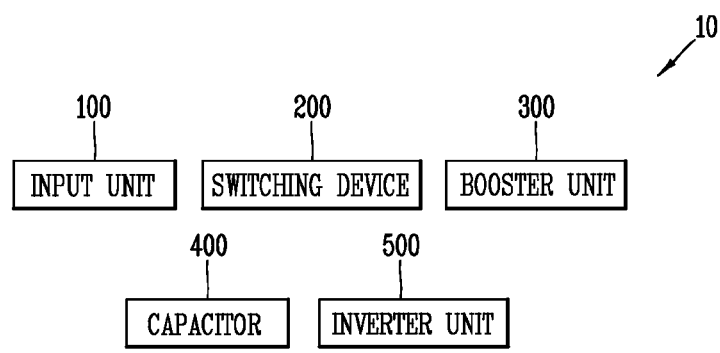
FIG. 1 is a block diagram illustrating a configuration of a photovoltaic inverter according to an embodiment of the present disclosure.

FIG. 1 is a block diagram illustrating a configuration of a photovoltaic inverter 10 according to an embodiment of the present disclosure.

As illustrated in FIG. 1, the photovoltaic inverter 10 includes an input unit 100, a switching device 200, a booster unit 300, a capacitor 400, and an inverter unit 500. The components of the photovoltaic inverter 10 illustrated in FIG. 1 are not essential and the photovoltaic inverter 10 may be formed with components greater or fewer than those illustrated in FIG. 1.

Figure 2:
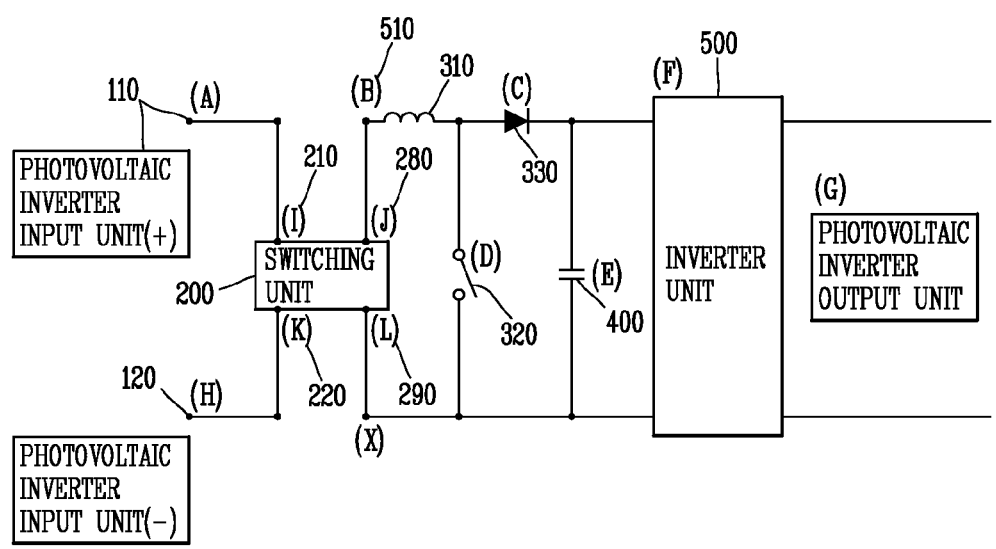
FIG. 2 is a circuit diagram of the photovoltaic inverter according to an embodiment of the present disclosure.

As illustrated in FIG. 2, the input unit 100 includes a first input unit 110 and a second input unit 120.

The first input unit 110 is connected to a positive (+) polarity or a negative (−) polarity of a photovoltaic module (not shown), and the second input unit 120 is connected to a negative (−) polarity or a positive (+) polarity of the photovoltaic module.

The switching device 200 checks connection states of the first input unit 110 and the second input unit 120 of the input unit 100 respectively connected to the positive (+) and negative (−) terminals of the photovoltaic module, and controls (or switches) the checked connection states of the input unit 100 (or the first input unit 110 and the second input unit 120) to fit polarities of a connection terminal of the inverter unit 500.

Figure 3:
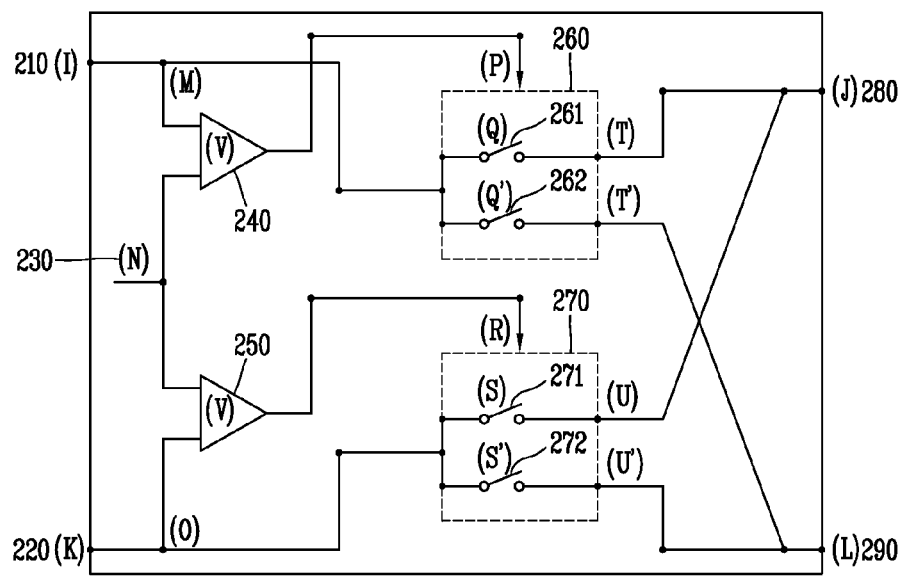
FIG. 3 is a circuit diagram of a switching device according to an embodiment of the present disclosure.

As illustrated in FIG. 3, the switching device 200 includes a first input terminal 210, a second input terminal 220, a reference voltage 230, a first comparator 240, a second comparator 250, a first switching unit 260, a second switching unit 270, a first output terminal 280, and a second output terminal 290.

The first input terminal 210 is connected to the first input unit 110 at one end thereof and to the first comparator 240 and the first switching unit 260 at the other end thereof.

The second input terminal 220 is connected to the second input unit 120 at one end thereof and connected to the second comparator 250 and the second switching unit 270 at the other end thereof.

The reference voltage (or a reference voltage providing unit) 230 provides a reference voltage (for example, "0V") to the first comparator 240 and the second comparator 250.

One end (or an input terminal) of the first comparator 240 may be connected to the other end of the first input terminal 210 and the other end of the reference voltage 230, and the other end (or an output terminal) of the first comparator 240 is connected to the first switching unit 260.

The first comparator 240 outputs a high signal (or a high level or a voltage/current delivered from the first input terminal 210) or a low signal to the first switching unit 260 according to a result of comparison between the first input terminal 210 and the reference voltage 230.

One end of the second comparator 250 is connected to the other end of the second input terminal 220 and the other end of the reference voltage 230, and the other end of the second comparator 250 is connected to the second switching unit 270.

The second comparator 250 outputs a low signal or a high signal to the second switching unit 270 according to a result of comparison between the second input terminal 220 and the reference voltage 230.

The first switching unit 260 is connected to the first input terminal 210 at one end thereof and connected to the first output terminal 280 and the second output terminal 290 at the other end thereof.

Also, the first switching unit 260 includes a first switch 261 and a second switch 262 connected in parallel.

Also, the first switching unit 260 controls operations of the first switch 261 and the second switch 262 connected in parallel based on an output from the first comparator 240.

Namely, when an output from the first comparator 240 is a high signal, the first switching unit 260 turns on the first switch 261 and turns off the second switch 252 to output a signal (or a high signal) delivered from the first input terminal 210 to the first output terminal 280.

Also, when an output from the first comparator 240 is a low signal, the first switching unit 260 turns off the first switch 251 and turns on the second switch 252 to output a signal (or a low signal) delivered from the first input terminal 210 to the second output terminal 290.

The second switching unit 270 is connected to the second input terminal 220 at one end thereof and connected to the first output terminal 280 and the second output terminal 290 at the other end thereof.

The second switching unit 270 includes a third switch 271 and a fourth switch 274 connected in parallel.

Based on an output from the second comparator 250, the second switching unit 270 controls operations of the third switch 271 and the fourth switch 272 connected in parallel.

Namely, when an output from the second comparator 250 is a high signal, the second switching unit 270 turns on the third switch 271 and turns off the fourth switch 272 to output a signal (or a high signal) delivered from the second input terminal 220 to the first output terminal 280.

Also, when an output from the second comparator 250 is a low signal, the second switching unit 270 turns off the third switch 271 and turns on the fourth switch 272 to output a signal (or a low signal) delivered from the second input terminal 220 to the second output terminal 290.

The first output terminal (or a positive (+) polarity output terminal of the switching device 200) is connected to the first switch 261 and the third switch 271 at one end thereof and connected to a positive (+) polarity connection terminal 510 of the inverter unit 500 at the other end thereof.

When the positive (+) polarity of the photovoltaic module is connected to the first input terminal 210, the first output terminal 280 is connected to the positive (+) polarity connection terminal 510 of the inverter unit 500 through the first input terminal 210 and the first switch 261.

Also, when the positive (+) polarity of the photovoltaic module is connected to the second input terminal 220, the first output terminal 280 is connected to the positive (+) polarity connection terminal 510 of the inverter unit 500 through the second input terminal 220 and the third switch 271.

The negative (−) polarity output terminal 290 of the second output terminal (or the switching device 200) is connected to the second switch 262 and the fourth switch 272 at one end thereof and is connected to a negative (−) polarity connection terminal 520 of the inverter unit 500 at the other end thereof.

When the negative (−) polarity of the photovoltaic module is connected to the first input terminal 210, the second output terminal 290 is connected to the negative (−) polarity connection terminal 520 of the inverter unit 500 through the first input terminal 210 and the second switch 262.

Also, when the negative (−) polarity of the photovoltaic module is connected to the second input terminal 220, the second output terminal 290 is connected to the negative (−) polarity connection terminal 520 of the inverter unit 500 through the second input terminal 220 and the fourth switch 272.

The booster unit 300 includes a reactor 310, a switch 320, and a diode 330.

The reactor 310 is connected to the first output terminal 280 at one end thereof and connected to the switch 320 and the diode 330 in series at the other end thereof.

The switch 320 is connected to the reactor in series at one end thereof, and connected to the second output terminal 290 in series at the other end thereof.

The switch 320 is connected to the diode 330 in parallel.

The diode 330 is connected to the reactor 310 in series and connected to the switch 320 in parallel.

The booster unit 300 boosts (or increases) a voltage (or a current/power) of the photovoltaic module delivered from the input unit 100 through the switching device 200.

The capacitor 400 is connected to the booster 300 in series.

The capacitor 400 charges the voltage (or power/energy) boosted by the booster unit 300.

The inverter unit 500 converts the voltage (or energy, smoothed DC power/voltage) charged in the capacitor 400 into alternating current (AC) power (or 3-phase power) and provides (or outputs) the converted AC power to an electric power system such as an induction motor (not shown), or the like.

The inverter unit 500 includes the positive (+) polarity connection terminal 510 and the negative (−) polarity connection terminal 520. Here, a pre-set positive (+) polarity may be connected to the positive (+) polarity connection terminal 510, and a pre-set negative (−) polarity may be connected to the negative (−) polarity connection terminal 520.

In this manner, the switching device 200 checks connection states of the first input unit 110 (which corresponds to the first input terminal 210) of the input unit 100 and the second input unit 120 (which corresponds to the second input terminal 220) respectively connected to the positive (+) and negative (−) terminals of the photovoltaic module, and based on the checked connection states of the first input unit 110 and the second input unit 120 (or connection states of the first input terminal 210 and the second input terminal 220), the switching device 200 may connect the first input unit 110 (or the first input terminal 210) to the positive (+) polarity connection terminal 510 or the negative (−) polarity connection terminal 520 of the inverter unit 500, and may connect the second input unit 120 (or the second input terminal 220) to the negative (−) polarity connection terminal 520 or the positive (+) polarity connection terminal 510 of the inverter unit 500, respectively.

Figure 4:
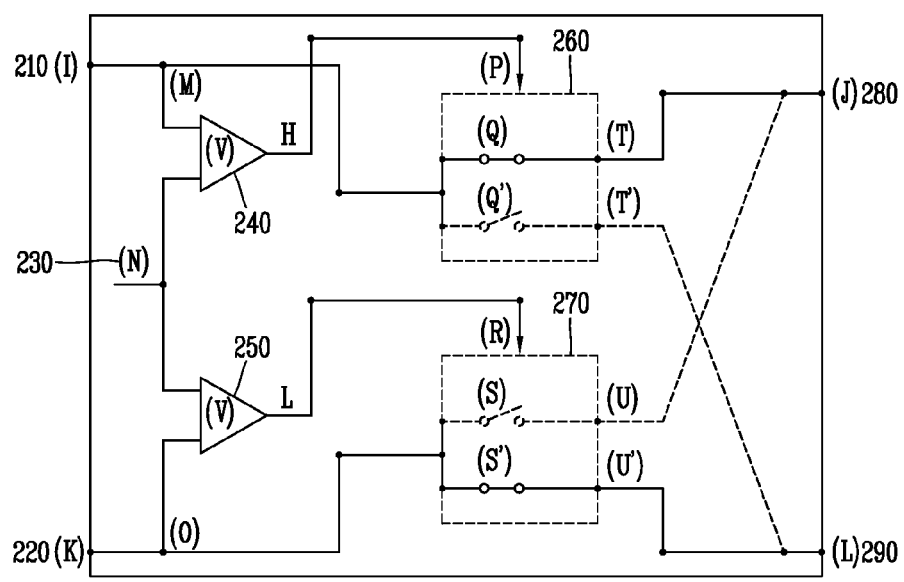
FIGS. 4 and 5 are views illustrating operational states of the switching device according to an embodiment of the present disclosure.

FIG. 4 is a circuit diagram illustrating operations of the switching device 200 when the positive (+) polarity of the photovoltaic module is connected to the first input terminal 210 of the switching device 200 and the negative (−) polarity of the photovoltaic module is connected to the second input terminal 220 of the switching device 200. Here, the portion indicated by the solid lines is a portion where a circuit is configured, and a portion indicated by the dotted line is a portion where a circuit is not configured (open state).

First, the comparator 240 compares a voltage having a positive (+) polarity of the photovoltaic module sensed at the first input terminal 210 with the reference voltage 230 (for example, 0V) and outputs a high signal (for example, H) according to the comparison result.

Thereafter, based on an output from the first comparator 240, the first switching unit 260 turns on the first switch 261 and turns off the second switch 262 to output the voltage having a positive (+) polarity of the first input terminal 210 to the first output terminal 280.

Also, the second comparator 250 compares the voltage having a negative (−) polarity of the photovoltaic module sensed at the second input terminal 220 with the reference voltage, and outputs a low signal (for example, L) according to the comparison result.

Thereafter, based on the output from the second comparator 250, the second switching unit 270 turns off the third switch 271 and turns on the fourth switch 272 to output the voltage having a negative (−) polarity of the second input terminal 220 to the second output terminal 290.

In this manner, when the positive (+) polarity and the negative (−) polarity of the photovoltaic module are normally connected to the input unit 100 of the photovoltaic inverter 10, the input unit 100 is connected to the output terminals 280 and 290 according to the characteristics of the terminals connected to the input unit 100 to normally connect the positive (+) polarity and the negative (−) polarity of the photovoltaic module and the inverter unit 500.

Figure 5:
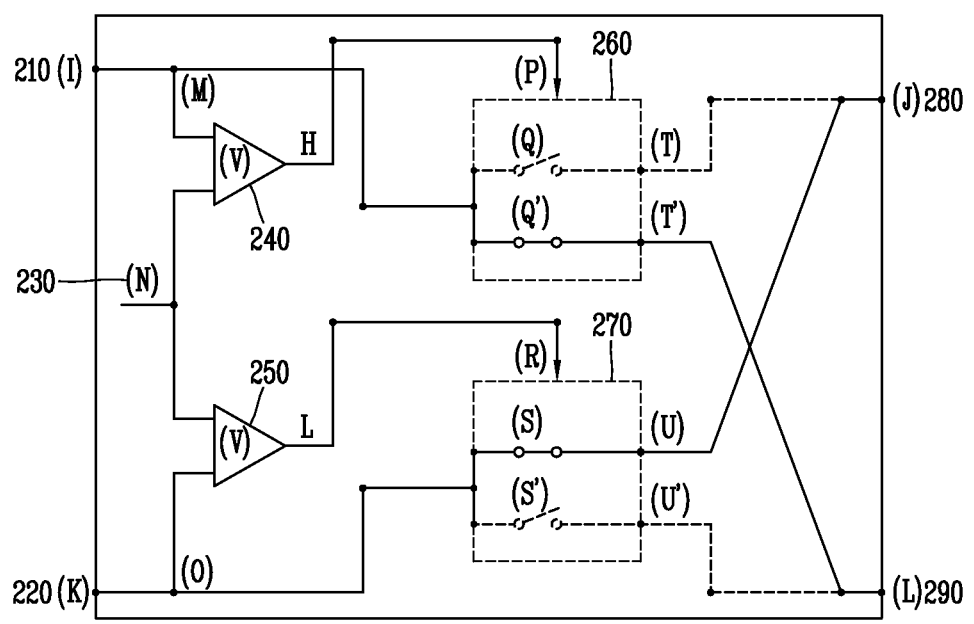

FIG. 5 is a circuit diagram illustrating operations of the switching device 200 when the negative (−) polarity of the photovoltaic module is connected to the first input terminal 210 of the switching device 200 and the positive (+) polarity of the photovoltaic module is connected to the second input terminal 220 of the switching device 200. Here, the portion indicated by the solid lines is a portion where a circuit is configured, and a portion indicated by the dotted line is a portion where a circuit is not configured (open state).

First, the comparator 240 compares a voltage having the negative (−) polarity of the photovoltaic module sensed at the first input terminal 210 with the reference voltage 230 (for example, 0V) and outputs a low signal (for example, L) according to the comparison result.

Thereafter, based on an output from the first comparator 240, the first switching unit 260 turns off the first switch 261 and turns on the second switch 262 to output the voltage having a negative (−) polarity of the first input terminal 210 to the second output terminal 290.

Also, the second comparator 250 compares the voltage having the positive (+) polarity of the photovoltaic module sensed at the second input terminal 220 with the reference voltage, and outputs a high signal (for example, H) according to the comparison result.

Thereafter, based on the output from the second comparator 250, the second switching unit 270 turns on the third switch 271 and turns off the fourth switch 272 to output the voltage having a positive (+) polarity of the second input terminal 220 to the first output terminal 280.

In this manner, when the positive (+) polarity and the negative (−) polarity of the photovoltaic module are connected to the input unit 100 of the photovoltaic inverter 10 in the mutually opposite manner, the input unit 100 is connected to the output terminals 280 and 290 such that it is opposite to the characteristics of the terminals connected to the input unit 100 to thus normally connect the positive (+) polarity and the negative (−) polarity of the photovoltaic module and the inverter unit 500.

In the embodiment of the present disclosure, the photovoltaic inverter includes the switching device connected to the photovoltaic module, so that the photovoltaic inverter can be normally connected to the photovoltaic module regardless of a connection polarity, and even when an operator erroneously connect polarities between the photovoltaic module and the photovoltaic inverter, damage to the photovoltaic inverter can be prevented and the photovoltaic inverter can normally perform a function thereof.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A photovoltaic inverter comprising:
an input unit comprising a first input unit and a second input unit respectively connected to a positive (+) polarity and a negative (−) polarity of a photovoltaic module;
a booster unit configured to boost a voltage of the photovoltaic module delivered from the input unit through a switching device;
a capacitor configured to charge the voltage boosted by the booster unit; and
an inverter unit comprising a positive (+) polarity connection terminal and a negative (−) polarity connection terminal and configured to convert the voltage charged in the capacitor into an alternating current (AC) and provide the converted AC voltage for an electric power system; and
the switching device configured to automatically connect the positive (+) polarity or negative (−) polarity of the photovoltaic module to the first terminal and the second terminal according to polarities of the inverter unit,
wherein the switching device comprises:
a first input terminal connected to the first input unit at one end thereof;
a second input terminal connected to the second input unit at one end thereof;
a first comparator configured to compare the first input terminal with a preset reference voltage and output a first comparison result including a high signal or a low signal;
a second comparator configured to compare the second input terminal with the preset reference voltage and output a second comparison result, opposite to the first comparison result, including a low signal or a high signal;
a first switching unit connected to the first comparator and the first input terminal at one end thereof and configured to be switched based on an output from the first comparator;
a second switching unit connected to the second comparator and the second input terminal at one end thereof and configured to be switched based on an output from the second comparator;
a first output terminal configured to connect the first input terminal to the positive (+) polarity connection terminal of the inverter unit when the output from the first comparator is a high signal, and configured to connect the second input terminal to the positive (+) polarity connection terminal of the inverter unit when the output from the second comparator is a high signal; and
a second output terminal configured to connect the first input terminal to the negative (−) polarity connection terminal of the inverter unit when the output from the first comparator is a low signal, and configured to connect the second input terminal to the negative (−) polarity connection terminal of the inverter unit when the output from the second comparator is a low signal.

2. The photovoltaic inverter of claim 1, wherein when the positive (+) polarity of the photovoltaic module is connected to the first terminal and the negative (−) polarity of the photovoltaic module is connected to the second terminal, the switching device connects the first terminal to the positive (+) polarity connection terminal of the inverter unit and the second terminal to the negative (−) polarity connection terminal of the inverter unit.

3. The photovoltaic inverter of claim 1, wherein when the negative (−) polarity of the photovoltaic module is connected to the first terminal and the positive (+) polarity of the photovoltaic module is connected to the second terminal, the switching device connects the first terminal to the negative (−) polarity connection terminal of the inverter unit and the second terminal to the positive (+) polarity connection terminal of the inverter unit.

4. The photovoltaic inverter of claim 1, wherein when the positive (+) polarity of the photovoltaic module is connected to the first input terminal through the first terminal and the negative (−) polarity of the photovoltaic module is connected to the second input terminal through the second terminal, the first comparator outputs a high signal,
the second comparator outputs a low signal,
the first switching unit outputs a voltage having the positive (+) polarity of the first input terminal to the first output terminal based on the high signal from the first comparator, and
the second switching unit outputs a voltage having the negative (−) polarity of the second input terminal to the second output terminal based on the low signal from the second comparator.

5. The photovoltaic inverter of claim 1, wherein when the negative (−) polarity of the photovoltaic module is connected to the first input terminal through the first terminal and the positive (+) polarity of the photovoltaic module is connected to the second input terminal through the second terminal, the first comparator outputs a low signal,
the second comparator outputs a high signal,
the first switching unit output a voltage having the negative (−) polarity of the first input terminal to the second output terminal based on the low signal from the first comparator, and
the second switching unit outputs a voltage having the positive (+) polarity of the second input terminal to the first output terminal based on the high signal from the second comparator.

* * * * *